United States Patent [19]

Rabenhorst

[11] 4,020,714
[45] May 3, 1977

[54] FILAMENT CONNECTED RIM ROTOR
[75] Inventor: David W. Rabenhorst, Clarksville, Md.
[73] Assignee: The Johns Hopkins University, Baltimore, Md.
[22] Filed: Dec. 4, 1975
[21] Appl. No.: 637,689
[52] U.S. Cl. ............................... 74/572; 74/573 R
[51] Int. Cl.² ........................................ G05G 1/00
[58] Field of Search .............................. 74/572, 573
[56] References Cited
UNITED STATES PATENTS

| 3,683,216 | 8/1972 | Post | 74/572 X |
|---|---|---|---|
| 3,859,868 | 1/1975 | Post | 74/572 |
| 3,964,341 | 6/1976 | Rabenhorst | 74/572 |

Primary Examiner—Samuel Scott
Assistant Examiner—Randall Heald
Attorney, Agent, or Firm—Kenneth E. Darnell; Robert E. Archibald

[57] ABSTRACT

The invention relates to rotary inertial energy storage devices comprised of wound filaments or discrete rings of essentially anisotropic material formed into a rim or disc-like configuration. Pairs of adjacent rings or windings in any given plane perpendicular to the axis of rotation of the present structure are tied or bonded together at discrete peripheral points at selected locations while adjacent rings which are not bound at these first-mentioned tie points are tied together at other peripheral points interdigitated between said first-mentioned tie points. These points of connection extend linearly throughout the structure.

17 Claims, 5 Drawing Figures

FILAMENT CONNECTED RIM ROTOR

STATEMENT OF GOVERNMENTAL INTEREST

The invention herein described was made in the course of or under a contract or subcontract thereunder, with the Department of the Navy.

BACKGROUND OF THE INVENTION

During the past several years a new flywheel technology has evolved which has resulted in a several-fold improvement in the energy density of flywheel structures while at the same time offering major advances in safety and economy. These improvements are for the most part brought about by the employment of anisotropic, filamentary materials, examples of such materials being carbon fibers, fiberglass fibers, and a new DuPont fiber known as Kevlar, all having strength-to-density properties significantly greater than the best practical steel. In addition, the filamentary composition of such materials is of significant importance in flywheel applications, since it is this property which enables the flywheel to be more readily designed for failure containment than solid steel flywheel structures previously proposed.

More particularly, it has previously been proposed that improved flywheels can be constructed in the form of wound disc structures with either "fiberglass" or steel foil as the principal structural material, such structures being described in detail in a Russian book entitled, "Inertial Energy Accumulators," by N. V. Gulia, Voronezh University Press, Voronezh, 1973. Unfortunately, such structures have had only limited success due to the hub attachment difficulty usually encountered with this type of structure. In an effort to overcome the hub attachment problem associated with wound flywheel structures, I previously proposed a circular brush flywheel configuration which utilizes radially oriented fibers or rods, such as are disclosed in my U.S. Pat. Nos. 3,698,262 and 3,737,694. On the other hand, for certain flywheel applications, it would be advantageous to have an alternative flywheel configuration which, at least in theory, appears capable of storing more energy per unit volume than this circular brush configuration, and at a reduced rotational speed for a given energy level.

The principal reason that previous attempts to build filament-wound flywheels have met with only limited success is the fact that the stress on the wound filaments varies as the square of the distance of the filaments from the center of rotation. The amount that the filament stretches is proportional to this stress; however, it is also proportional to the length of the filament, which length varies directly with the radius. Thus the amount of radial stretch actually varies with the cube of the radius. In other words, in a wound rotor having an inside radius of one-third its outside radius, the outside filaments would stretch 27 times as much as the filaments on the inside. In this situation, as has been demonstrated many times in past experiments, the flywheel breaks into many concentric rings long before the filaments have reached their breaking stress. This, of course, is true if there are no extra radial filaments in the flywheel structure to take the radial loads. On the other hand, if such extra filaments are added, then the weight of these filaments must be added when determining the energy density of the structure. This simple paradox accounts for the lack of success of the filament-wound and multi-rim flywheels previously attempted; performance typically being about 20–30% of theoretical.

One previously proposed manner of accommodating the differential stretching of the filamentary materials is to provide an elastomer matrix which acts as a spacer between the rings or filaments of a multi-ring flywheel. However, it is not clear that the elastomer can withstand the high acceleration forces occurring during flywheel operation and at the same time provide the required stretch capabilities in one direction while also providing the required stiffness in other directions. Moreover, the elastomer matrix will occupy about 30% as much space as the working filaments and thereby degrade volume, weight, and cost.

SUMMARY OF THE INVENTION

In order to overcome the deficiencies of the prior art and more fully realize the advantages of rim and disc-type wound filaments rotor structures, it is proposed in accordance with the present invention that the multiple rings, filament windings, or composite rod windings comprising the flywheel be tied or bonded together along lines extending axially through the structure, pairs of rings or windings in any given plane of the flywheel taken perpendicular to the axis of rotation being joined together at discrete peripheral points at selected locations on the rings or windings while adjacent rings or windings not bound at these first-mentioned points are tied together at other peripheral points interdigitated between said first-mentioned points.

A flywheel configured according to the invention would require no matrix material between the discrete rings or wound elements, the individual rings or windings being thereby allowed to radially expand more freely along the unbound portions thereof by bending in the radial direction. Loading along the line of tie points is only a fraction of the load imposed on a structure wherein all of the rings or windings are tied together at all locations.

In accordance with the present invention, the proposed flywheel structure allows use of most filamentary materials, including "bare" filaments such as wire, nylon, or Kevlar. This is particularly important in applications employing relatively small size flywheels wherein this more or less flexible filament-wound structure can satisfactorily hold its wound shape under gravity forces without damage when not operating. It is also contemplated that, in order to reduce the size and cost of the overall flywheel structure, an inexpensive ballast material can be utilized particularly in the inner rings of the ring structure, as will be explained hereinafter, since the stress in the individual ring is a function of the square of that ring's radius, and therefore all rings except the outermost are operating below their maximum stress capability, hence below their maximum energy capability.

In view of the foregoing, one object of the present invention is to provide an improved filament-wound or discrete ring flywheel structure wherein adjacent pairs of filament windings or rings are joined together in a predetermined manner as alluded to above and as will be described in detail hereinafter.

A further object of the present invention is to provide a filament wound or discrete ring flywheel structure wherein no matrix material is employed between the rings or windings constituting the rim portion of the structure.

A further object of the present invention is to provide a rotary energy storage device or flywheel which utilizes anisotropic filamentary materials and which possesses substantial energy per unit volume and per unit weight.

A further object of the present invention is to provide a rotary energy storage device or flywheel having substantial energy per unit volume and weight, at a low cost and exhibiting increased safety.

Other objects, purposes and characteristic features of the present invention will in part be pointed out in light of the following description of the preferred embodiments.

DESCRIPTION OF THE PREFERRED EMBODIMENTS

It is proposed in accordance with the present invention to provide an improved discrete ring or filament wound flywheel structure wherein the rim or disc portion is comprised of multiple discrete rings or filament windings of high tensile strength, anisotropic materials, such as carbon or fiberglass fibers, having strength to density ratios many times greater than the best practical steels previously proposed for use in flywheel applications. As noted earlier, a further fiber material from which the multiple rings or filamentary windings can be formed for the rim portion of the proposed flywheel of the present invention is a new fiber marketed by DuPont under the trade name Kevlar which has a tensile strength, for the unidirectional composite, of 250,000 psi and a density of 0.05 lb per cubic inch; the tensile strength of the bare elements having been measured at over 500,000 psi. This fiber is currently being used as a structural material in a wide variety of static-loaded components in most of the major aircraft manufactured in the United States today. It does not suffer appreciably from the static fatigue problems usually associated with fiberglass; it is often used at a very high percentage of its tensile strength; and, its strength-to-density and modulus of elasticity are both considerably higher than glass.

Figure 1:
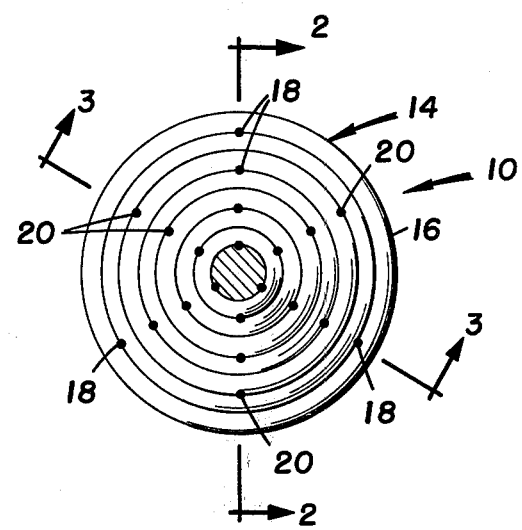
FIG. 1 is a plan view of one embodiment of the invention wherein certain pairs of adjacent filamentary windings are bonded together at three discrete locations spaced 120° apart, at least one filamentary winding in each pair of windings being bonded to an adjacent filamentary winding at points interdigitated between said first-mentioned points.

Referring now to the drawings and particularly to FIG. 1, a flywheel structure is seen generally at 10 to comprise a shaft member 12 and rim member 14. The rim member 14 is formed of a plurality of layers of essentially concentric filamentary windings 16. It is to be understood that the filamentary windings 16 can be comprised of wound anisotropic filamentary materials, discrete rings of anisotropic filamentary material, or composite rings or windings of anisotropic material. For simplicity, the numeral 16 will be taken to refer to "filamentary windings" with the understanding that this term refers to both windings and discrete rings of essentially anisotropic materials. It can also be seen by referring to FIGS. 2 through 4 that the rim member 14 is formed of a plurality of stacked "layers" of such windings 16, the "layers" having essentially a common axis of rotation and essentially being identical in shape and size. The windings 16 are shown enlarged relative to the size of the shaft 12 or to the rim member 14 for ease of illustration.

FIG. 1 essentially shows only the uppermost "layers" of the windings 16, the remaining "layers" being disposed in aligned fashion "behind" this uppermost layer. The windings 16 are seen to be essentially concentrically disposed within the layer of windings, the windings 16 being annular in nature and having apparent centers which coincide and lie on the axis of rotation of the flywheel structure 10. The windings 16 are tied or otherwise, joined together such as by bonding with an epoxy or other adhesive compound, at selected points. These bonded joints will be referred to as joints 18 and 20 for reasons which will become apparent. The joints 18 and 20 lie on radii which extend from the axis of rotation of the flywheel structure 10, the radii along which the joints 18 lie being offsett 120° from each other while the radii along which the joints 20 lie are also offset 120° from each other and are additionally interdigitated between the joints 20 at equal angles therefrom. Thus, a 60° angle exists between each radius bearing joints 18 and each radius bearing the joints 20.

The joints 18 can be seen to occur between pairs of the filament windings 16, e.g., the outermost winding 16 and the winding 16 adjacent thereto being held together at 18. Along the radius bearing this just-mentioned joint 18, the next adjacent (or "third") winding 16 (going toward the shaft 12) is not bound to the winding 16 which is bound to the outermost winding 16. However, this "third" winding 16 is bound to the inner winding 16 lying adjacent thereto. Similarly, each radius having the joints 18 lying therealong have pairs of windings 16 joined to each other at the joints 18, each winding 16 in each pair of windings being unbonded along that radius to the adjacent winding 16 in the adjacent pair of windings.

Now considering the joints 20, which lie along the radii interdigitated between the radii along which the joints 18 lie as aforesaid, the outermost joint 20 along each of these interdigitated radii is disposed between the second and third outermost windings 16. Successively inwardly disposed joints 20 join parts of windings 16 in the same fashion as do the joints 18, i.e., pairs of the windings are joined together with each winding 16 in each pair of windings being unbonded along that particular radius to the adjacent winding 16 in the adjacent pair of windings. Stated in another fashion, each winding 16 is bonded to the adjacent winding 16 at three distinct points spaced apart at regular angles. However, points connecting a given winding 16 to the windings 16 adjacent thereto are not aligned with each other along one radii of the rim member 14 but are offset a given regular angle from each other. In this manner, the joints 18 along any one of the radii bearing said joints 18 alternate between the "spacings" between the windings. Similarly, the joints 20 along the "offset" radii alternate between the "spacings" between the windings along the "offset" radii.

It should be noted that the joints 18 and 20 are shown to respectively lie along three radii each, which radii are spaced at regular angles as aforesaid. However, the number of radii bearing the joints 18 can be configured to lie along any given number of radii equal to or greater than two (without repeating) in number, these radii being offset at equal angles from each other. The number of radii bearing the interdigitated joints 20 will be taken to be the same number as the radii bearing the joints 18 and will be offset as described above.

Figure 2:
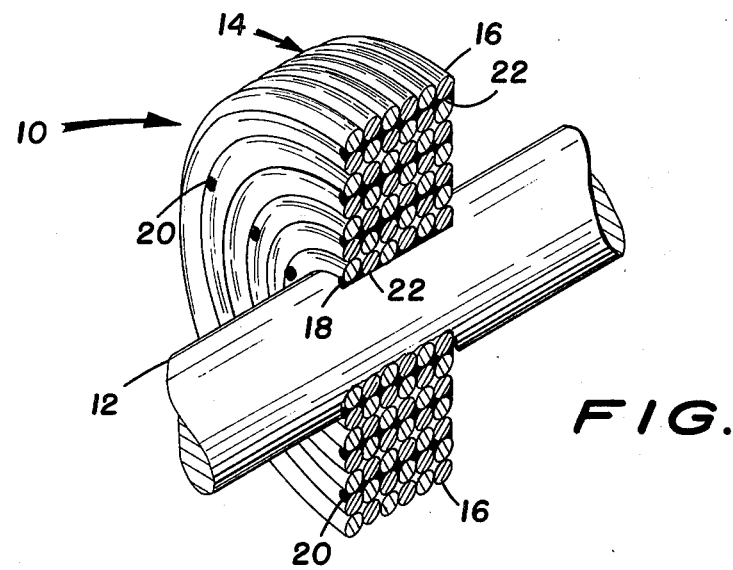
FIG. 2 is a perspective view in partial section taken along line 2—2 of FIG. 1.
Figure 3:
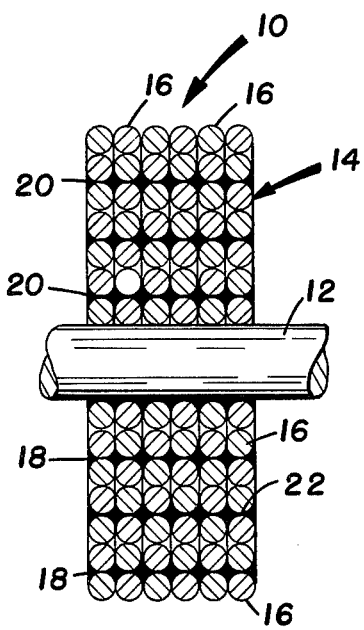
FIG. 3 is an elevational view in partial section taken along line 3—3 of FIG. 1.
Figure 4:
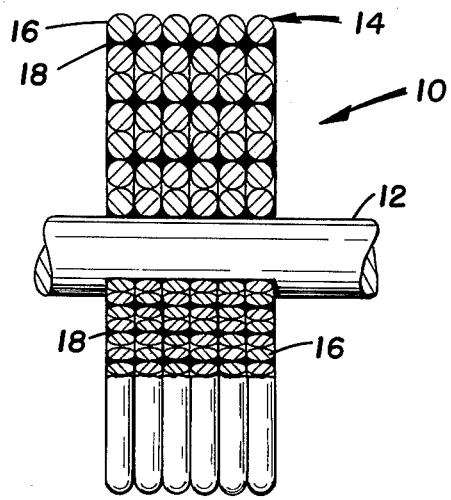
FIG. 4 is an elevational view in partial section taken along line 2—3 of FIG. 1; and, FIG. 5 is an exaggerated schematic illustrating deformation of the invention under rotational stress.

As can further be seen in FIGS. 2, 3, and 4, each of the joints 18 and 20 effectively extend along a line parallel to the shaft 12 throughout the rim member 14 to form lines of connection 22 which can be configured to tie the "layers" of windings 16 together. Thus, in certain embodiments of the invention, an adhesive material such as epoxy could be disposed along selected lines extending between faces of the rim member 14 to hold the windings 16 together along these lines. The lines of connection 22 would extend in a direction normal to the plane of any given layer of windings 16 throughout the rim member 14 and through the points at which the joints 18 and 20 are located.

Referring particularly to FIGS. 2 and 3, two different diameters of the rim member 14 are seen to have the joints 18 lying along one-half of the diameter and the "alternating" joints 20 lying along the other half of the diameter. FIG. 4 illustrates the angular section which would have to be taken from the rim member 14 in order to view two radii along which the joints 18 (or 20) lie.

As has previously been noted, individual discrete rings or individual filament windings can be utilized for the windings 16. The wound configurations can employ bare filaments, composite wires, composite rods, or wound sheets, such as paper or foil. These configurations could be made from materials such as fiberglass, metals, carbon fibers or plant fibers. Typical of these configurations is a fiberglass manufactured by the Condex Corporation which has an apparent composite ultimate tensile strength in excess of 450,000 psi. These and other essentially anisotropic filamentary materials and composites formed of "whiskers" and the like can be wound almost like a spool of thread using constant modulus and constant density without matrix material between the windings 16. The structures can be wound onto an annular hub if desired to form a rim member which would then be attached to a shaft either directly or through the use of a conventional spoke member. The windings 16, when of the wound type, can be wound by the overlapping level-wind technique used extensively in the filament production industry. The windings 16 would still be tied together as indicated above along lines of connection 22 extending through the wound rim member parallel to the shaft.

Figure 5:
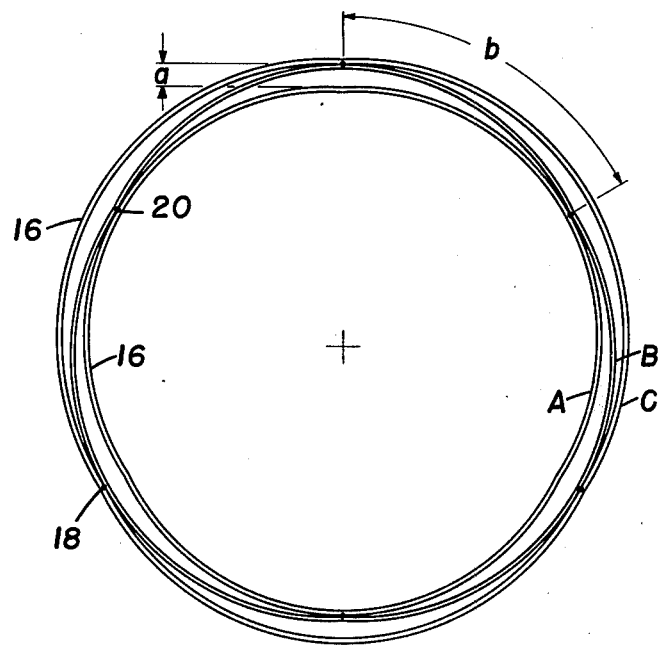

FIGS. 1 through 4 illustrate the structure of the invention when at rest. FIG. 5 schematically illustrates in an exaggerated manner the "deformation" of windings 16 when the flywheel structure 10 is rotated. It is to be understood that the windings 16 of FIG. 5 deform only slightly on rotation. However, in order to illustrate the function of the joints 18 and 20, it is necessary to show the windings 16 under rotational stress in an exaggerated fashion. If the windings 16 of FIG. 5 are labeled A, B, and C in a radii direction, it can be seen that winding A is attached to winding B at three locations which correspond to the location of the joints 20 in FIGS. 1 through 4. The winding B is attached to the winding C at three locations which correspond to the location of the joints 18 in FIGS. 1 through 4, the joints 18 and 20 being angularly offset as aforesaid. Taking the distance $a$ (shown greatly exaggerated) to be the expansion between adjacent windings and the distance $b$ to be the peripheral distance between adjacent joints 18 and 20, the ratio of $a$ to $b$ is seen to be small. Thus, the load imposed at the joints 18 and 20 is of a low order of magnitude such that loading is effectively transferred from a given winding to the adjacent winding. The windings 16 are thereby held together in a structure which accommodates the loading imposed on the structure by rotational stresses.

Although not shown explicitly in the drawings, it is possible to form the rim member 14 onto a hub such as is described by me inter alia in copending U.S. Pat. application Ser. No. 553,113, filed Feb. 26, 1975, such a hub being joined to the shaft member 12 by spoke arrangements which are well-known in the art.

It is therefore to be understood that the invention can be practiced other than as described hereinabove, the scope of the invention being limited only by the appended claims.

I claim:

1. An inertial energy storage device for rotation about a shaft comprising:
    rim means carried on the shaft and comprised of a plurality of annular rim elements formed of essentially anisotropic material having substantial tensile strength along longitudinal axes thereof; and,
    means for holding certain of the rim elements together at selected locations of the rims means, said means being located along at least one radius extending from the axis of rotation of the rim means and being disposed at alternate intersections of the radius and the physical interfaces between the rim elements.

2. The inertial energy storage device of claim 1 and further comprising hub means for carrying the rim means, the hub means being attached to the shaft.

3. The inertial energy storage device of claim 1 wherein the last-mentioned means are disposed along a plurality of radii extending from the axis of rotation of the rim means, the radii being offset from each other at regular angles.

4. The inertial energy storage device of claim 3 wherein at least certain of the last-mentioned means which lie along certain of the radii are disposed between rim elements which are not held by other of the last-mentioned means at the intersections of said rim elements and adjacent radii.

5. The inertial energy storage device of claim 4 wherein the last-mentioned means lie along radii which are offset from each other at 60° angles.

6. The inertial energy storage device of claim 1 wherein the rim elements comprise filament windings.

7. The inertial energy storage device of claim 1 wherein the rim elements comprise discrete rings.

8. The inertial energy storage device of the claim 1 wherein the last-mentioned means comprise adhesive material which join the rim elements together at selected locations on the rim elements.

9. The inertial energy storage device of claim 1 wherein the annular rim elements are formed into layers, the axis of rotation of the device forming a line of centers of the layers, the last-mentioned means extending continuously through the rim means along lines parallel to the axis of rotation.

10. An inertial energy storage device for rotation about a shaft comprising:
rim means carried on the shaft and comprised of a plurality of annular rim elements formed of essentially anisotropic material having essential tensile strength along longitudinal axes thereof, the annular rim elements being formed into layers, the axis of rotation of the device forming a line of centers of the layers, and,
means for holding certain of the rim elements together at selected locations of the rim means, said means extending continuously throughout the rim means along lines parallel to the axis of rotation.

11. The inertial energy storage device of claim 10 and further comprising hub means for carrying the rim means, the hub means being attached to the shaft.

12. The inertial energy storage device of claim 10 wherein the last-mentioned means are disposed in a plurality of radial planes extending from the axis of rotation of the rim means, the radial planes being offset from each other at regular angles.

13. The inertial energy storage device of claim 12 wherein at least certain of the last-mentioned means which lie in certain of the radial planes are disposed between rim elements which are not held by other of the last-mentioned means at the intersections of said rim elements and adjacent radial planes.

14. The inertial energy storage device of claim 13 wherein the last-mentioned means lie along radii which are offset from each other at 60° angles.

15. The inertial energy storage device of claim 10 wherein the rim elements comprise filament windings.

16. The inertial energy storage device of claim 10 wherein the rim elements comprise discrete rings.

17. The inertial energy storage device of claim 10 wherein the last-mentioned means comprise adhesive material which join the rim elements together at selected locations on the rim elements.

* * * * *